Patented Dec. 2, 1924.

1,518,072

UNITED STATES PATENT OFFICE.

WILLIAM JONES, OF NEW YORK, N. Y., ASSIGNOR TO VESTA M. JONES, OF NEW YORK, N. Y.

PRODUCTION OF BONE BLACK.

No Drawing.  Application filed September 1, 1923. Serial No. 660,655.

*To all whom it may concern:*

Be it known that I, WILLIAM JONES, a subject of Great Britain, and residing at 11 Wadsworth Ave., New York, in the county and State of New York, have invented a new and useful Improvement in the Production of Bone Black, of which the following is a specification.

My invention relates to a new method of preparing, or producing bone-black, to be used as a filtering medium, which gives the same results and can be produced at a much lower cost than the regular bone-black.

I have discovered that it is possible to re-carbonize the bone phosphates after the carbon has been removed, as in the process of manufacturing glue or gelatine.

Steamed bone, an article of commerce, is the bone after the gelatine or glue has been removed, or extracted, and from which has been removed most of the carbon and practically all of the nitrogen compounds. I have found that this nitrogen has absolutely no action in the purifying action of the char, therefore it is only necessary to replace the carbon to produce a char having equal activity, as a purifying and decolorizing agent, to the original bone.

This steamed bone is now used largely as a fertilizer and also to some extent as a cattle food, it of course has a considerably less market value than the new bone. The manufacturing costs of bone-black from this material being no more than that of the regular bone-black, I realize a large saving in the production of a bone-black equal in all respects to regular bone-black. Furthermore, this steamed bone being thoroughly washed in the process of extracting the gelatine, all alkaline and other soluble salts are removed, which renders it unnecessary to wash bone-black made from this material through many changes of hot water, as is required to be done with the regular bone-black, to remove the alkalinity before it can be used.

In the production of this bone-black I use this steamed bone adding to it enough carbon to bring the percentage of carbon up to the required amount, about 6 to 8%. The amount required to be added will vary in accordance with the thoroughness with which the gelatine has been extracted.

I first grind this steamed bone to the required fineness, then mix with the ground bone the required amount of a carbonaceous substance, which when calcined will produce an active carbon, preferably a hard pitch or asphalt, which is ground and mixed with the bone, this mixture is then calcined in the usual way, out of contact with air. It is obvious that the percentage of carbon may be regulated as desired. Substances other than pitch that will produce an active carbon, may be used in its stead.

Having thus described my invention, I claim:

1. A method of producing bone-black, by using the by-product, known as steamed bone, re-carbonizing this bone by mixing with it a carbonizing material capable of yielding an active carbon when calcined out of contact with air, and calcining.

2. Bone-black, produced from steamed bone re-carbonized by mixing with it a carbonizing material capable of yielding an active carbon when calcined out of contact with air, and calcining.

WILLIAM JONES.